United States Patent [19]
Nelson

[11] Patent Number: 5,615,637
[45] Date of Patent: Apr. 1, 1997

[54] AUTOMATED MILKING PARLOR

[75] Inventor: William S. Nelson, Sun Prairie, Wis.

[73] Assignee: DEC International, Inc., Madison, Wis.

[21] Appl. No.: 409,841

[22] Filed: Mar. 27, 1995

[51] Int. Cl.$^6$ .................................................. A01K 1/12
[52] U.S. Cl. ........................................................ 119/14.03
[58] Field of Search ................................ 119/14.03, 520, 119/524

[56] References Cited

U.S. PATENT DOCUMENTS

| | | |
|---|---|---|
| 2,092,440 | 9/1937 | Cain . |
| 3,921,586 | 11/1975 | Sweeney et al. ............... 119/14.04 X |
| 4,000,718 | 1/1977 | Brown ................................. 119/14.03 |
| 4,715,321 | 12/1987 | Vandenberg et al. ............. 119/14.03 |
| 4,951,608 | 8/1990 | Reisgies et al. ................... 119/14.03 |
| 4,977,856 | 12/1990 | Norwood ........................... 119/14.03 |
| 5,000,119 | 3/1991 | Moreau et al. ................. 119/520 X |
| 5,140,942 | 8/1992 | Flocchini ........................... 119/14.02 |
| 5,156,108 | 10/1992 | Hawbaker ......................... 119/14.03 |
| 5,203,280 | 4/1993 | Nelson .............................. 119/14.03 |

FOREIGN PATENT DOCUMENTS

| | | |
|---|---|---|
| 350558 | 1/1990 | European Pat. Off. .......... 119/14.03 |
| 2305125 | 10/1976 | France . |
| 2565778 | 6/1984 | France . |
| 2516279 | 4/1975 | Germany . |
| 3639840A1 | 10/1976 | Germany . |

Primary Examiner—Robert P. Swiatek
Attorney, Agent, or Firm—Andrus, Sceales, Starke & Sawall

[57] ABSTRACT

A milking parlor of the type having an entry gate has a plurality of sequencing gates mounted on pedestals at substantially the same height with the gates overlapping, but not touching. A biasing arrangement that urges the sequencing gate to a closed position is mounted coaxially and inside the pedestal supporting the sequencing gate. A wedge-shaped positioning device is mounted on the rotating gate to urge the cows into the proper milking position, and an automated system detects the end of the milking process and the positioning of the last cow to automatically open and close the entry gate.

6 Claims, 6 Drawing Sheets

5,615,637

AUTOMATED MILKING PARLOR

BACKGROUND OF THE INVENTION

This invention relates to in general to the field of cattle stalls and more specifically to a milking parlor having a unique and improved entry/exit and positioning system. While the invention may be utilized with a variety of milking parlor designs, the invention is particularly adapted for use with a milking parlor entry/exit system such as that shown in U.S. Pat. No. 5,203,280 and the teachings of that patent are incorporated herein by reference.

Rotary reels such as that shown in the '280 patent can be utilized to urge the cows out of the milking stall and to help position the cow in the milking stall. However, it is important to precisely position the cow prior to milking and to have a positioning device that will accommodate various sizes of cows.

In the past, rotating, overlapping gates have been utilized to define the milking stalls in parlors of this type. These gates have typically been biased to a closed position by an external spring which could be interfered with and damaged by a moving animal. Also, the gates came into contact upon closing and the noise of a closing gate engaging an adjacent gate would have an adverse impact on the cows.

Finally, in earlier prior art milking parlors, it would be necessary for an attendant or operator to manually open an entry gate to allow a new group of cows to enter the parlor after the previously milked cows have been removed from the parlor.

SUMMARY OF THE INVENTION

It is an object of the present invention to provide a system that overcomes the problems associated with prior art milking parlors and their associated entry/exit systems.

In accordance with one aspect of the invention, the rotating gate of the milking parlor is provided with a plurality of spaced, upwardly angled wedge shaped projections that engage and position the cow in the milking stall.

In accordance with another aspect of the invention, the sequencing gates that define the milking stalls are mounted at substantially the same height and define a gap between the gates so that the gates can overlap without touching when the gates are in the closed position.

In accordance with still another aspect of the invention, the sequencing gates are biased to a closed position by a spring that is internally and co-axially mounted within the pedestal supporting the sequencing gate.

In accordance with still another aspect of the invention, the milking parlor is provided with a system that detects the conclusion of the milking operation and initiates the exiting process of the rotating reel. Once the rotating reel has reached a predetermined position, the entry gates open and the next group of cows is allowed to enter the parlor. Upon detecting a predetermined number of cows passing through the entry gate, the entry gate is closed and the rotating reel is indexed to position the cows within their stalls.

The present invention thus provides an improved and automated milking parlor entry/exit system.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
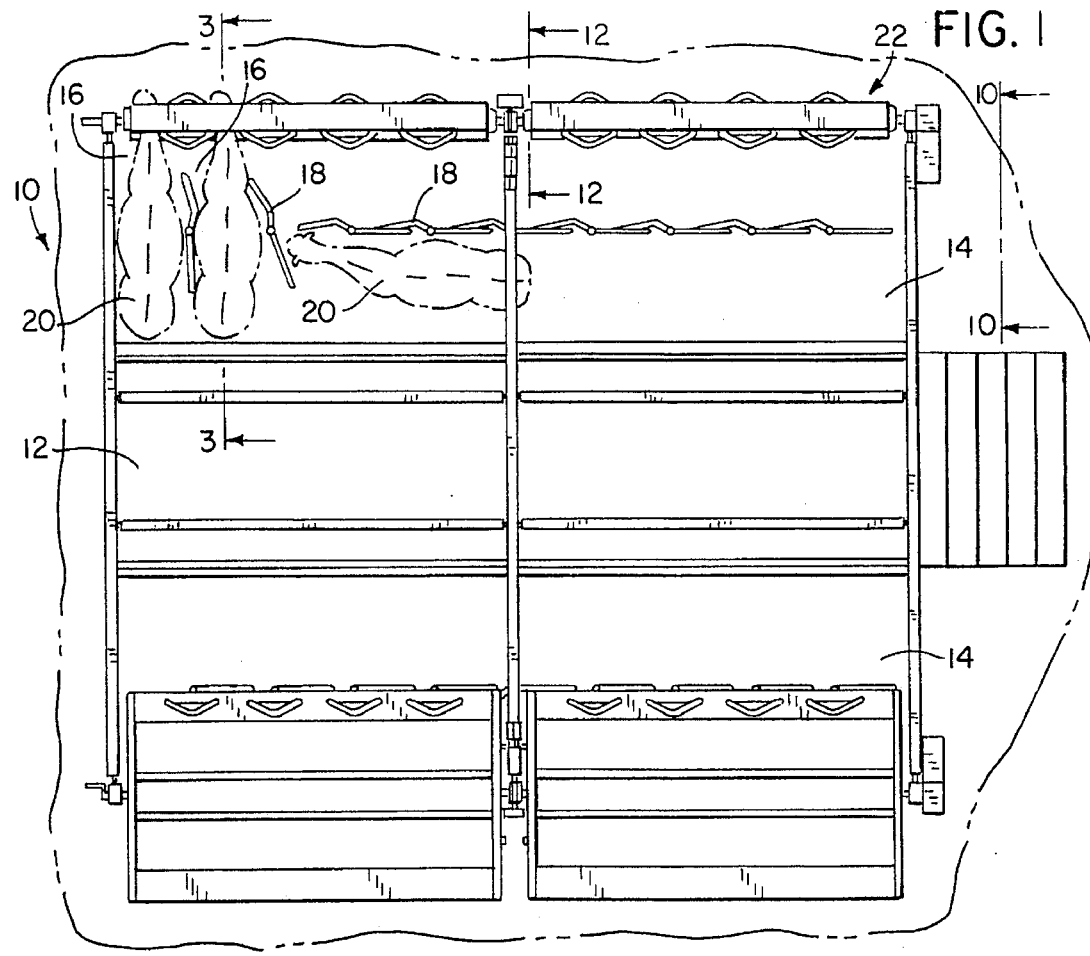
FIG. 1 is a plan view of a milking parlor constructed according to the present invention.
Figure 2:
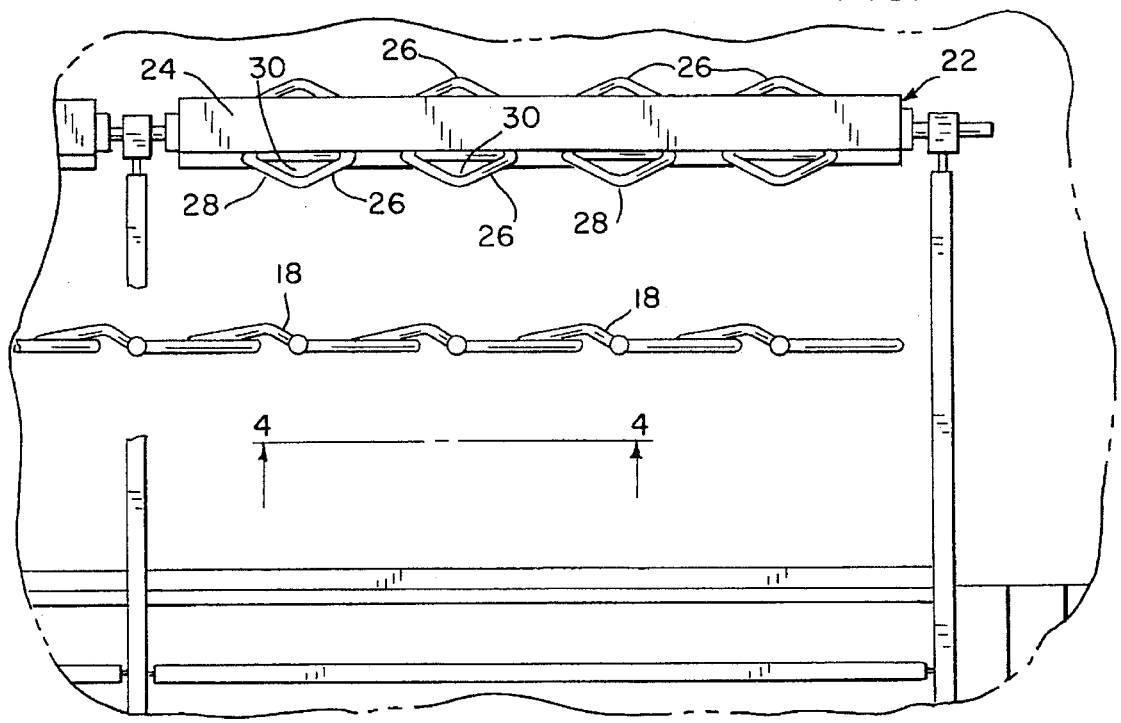
FIG. 2 is an enlarged plan view of the stall area of the milking parlor of FIG. 1.
Figure 3:
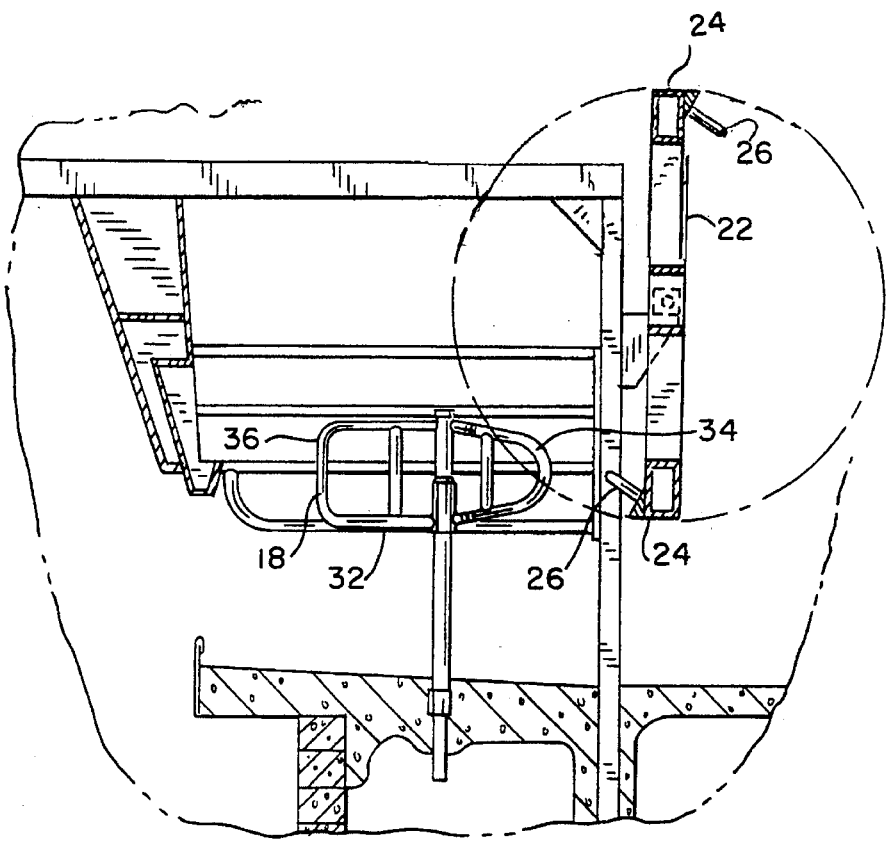
FIG. 3 is a cross-sectional view along the line 3—3 of FIG. 1.

FIGS. 1 and 2 illustrate a milking parlor 10 of the type having a centrally located operator pit 12 with cow stands or platforms 14 disposed on either side. A plurality of milking stalls 16 are defined by a plurality of sequencing gates 18.

As seen in FIG. 2, sequencing gates 18 are biased to a normally closed position and as a cow 20 proceeds down platform 14, it is directed against sequencing gate 18 and forced to move it to its open position as shown in FIG. 1. When in their open position, adjacent sequencing gates 18 define milking stall 16.

Milking parlor 10 is also provided with a rotating reel type gate 22 constructed and operated according to the teachings of U.S. Pat. No. 5,203,280 which is incorporated herein by reference. Brisket beam 24 of rotating gate 22 is provided with a plurality of spaced apart upwardly inclined wedge shaped positioning devices which are formed from a tubular loop 28 that defines a triangularly shaped central opening 30. When brisket beam 24 is rotated to position cows 20, the wedge shaped upwardly angled loop 28 engages the cow on her shoulder and encourages the cow to move toward the center of milking stall 16. The wedge shape and the upward inclination of positioning device 26 helps position and center cows of various sizes.

Figure 4:
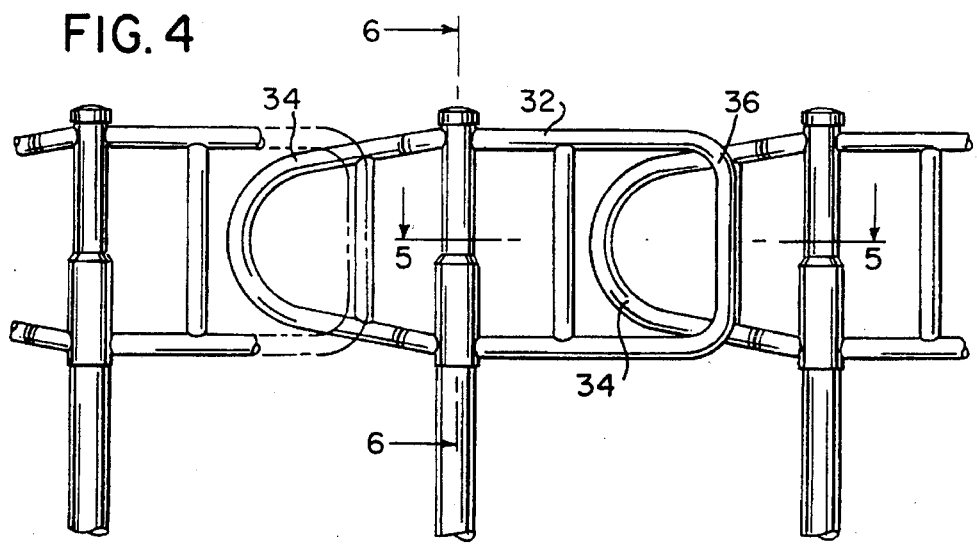
FIG. 4 is a sectional view taken along the line 4—4 of FIG. 2.
Figure 5:
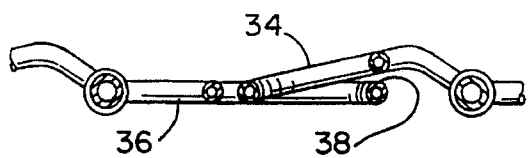
FIG. 5 is a sectional view taken along the line 5—5 of FIG. 4.
Figure 6:
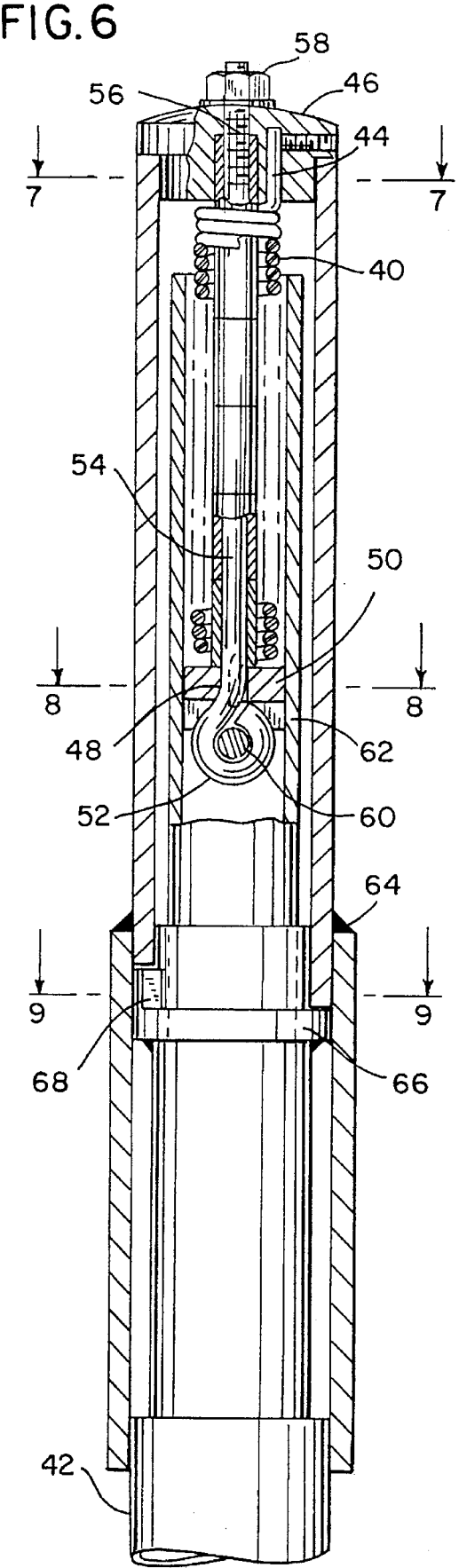
FIG. 6 is a cross-sectional view of the pedestal supporting the sequencing gate.
Figure 7:
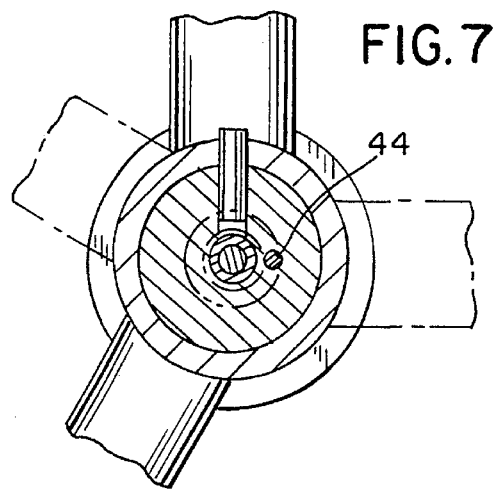
FIG. 7 is a sectional view along the line 7—7 of FIG. 6.
Figure 8:
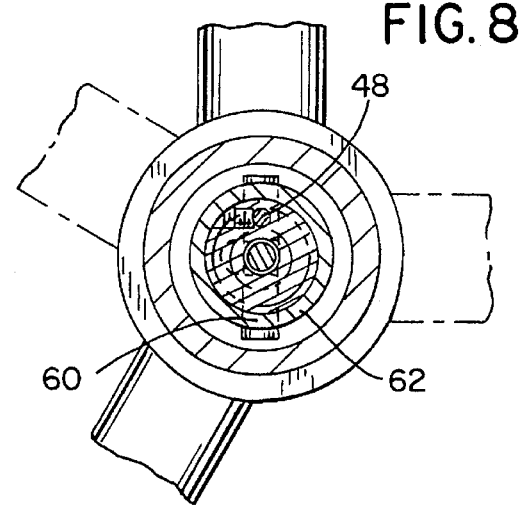
FIG. 8 is a sectional view along the line 8—8 of FIG. 6.
Figure 9:
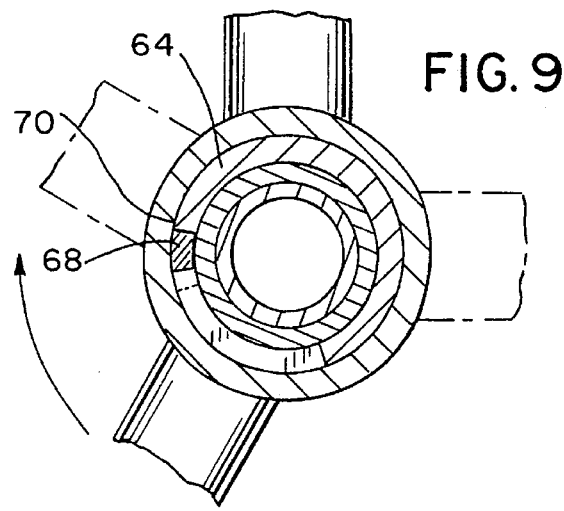
FIG. 9 is a sectional view along the line 9—9 of FIG. 6.
Figure 10:
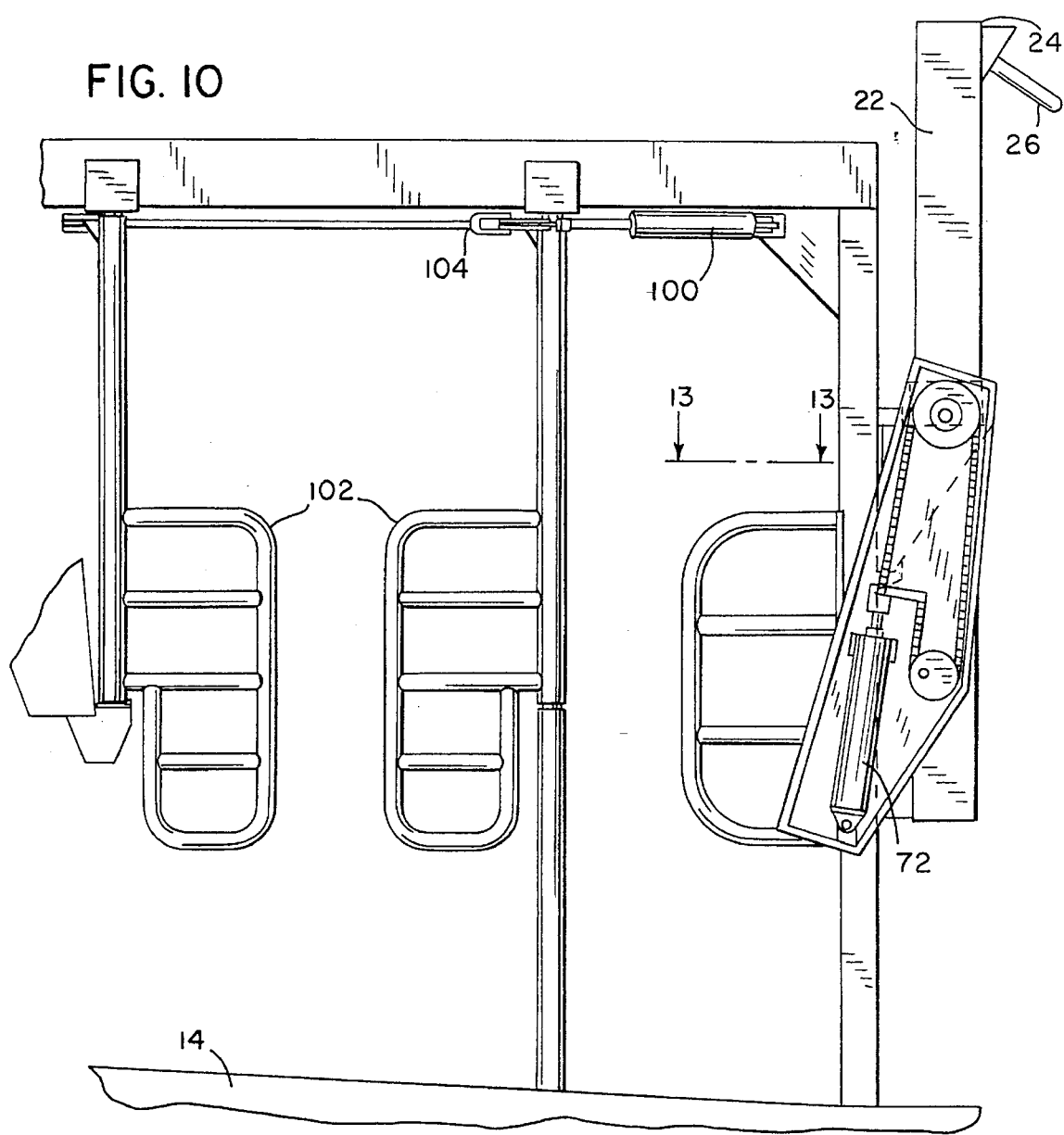
FIG. 10 is an end view of the entry gate for the milking parlor.
Figure 11:
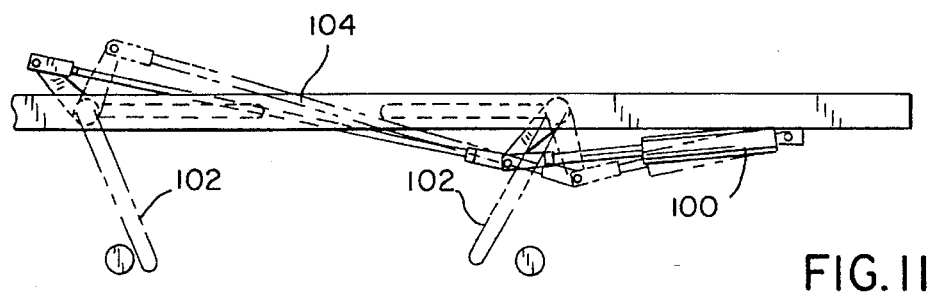
FIG. 11 is a plan view of the entry gate of FIG. 10.
Figure 12:
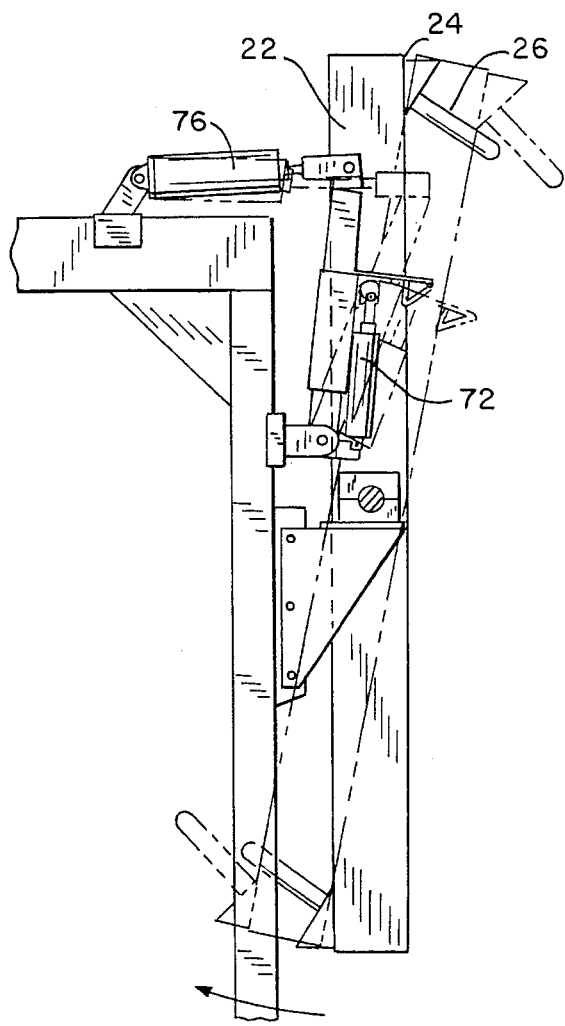
FIG. 12 is a side cross-sectional view of the rotating gate utilized in the milking parlor.

As best seen in FIGS. 4 and 5, sequencing gates 18 are formed from a tubular framework 32 that has a forward tapering end 34 and a squared rear end 36. When gates 18 are in their closed position, tapered end 34 nests within squared end 36 of an adjacent gate. Sequencing gates 18 are also provided with a stop so that a gap 38 is established between the gates when they are in their closed position. The nesting feature and the gap 38 prevent any contact of tubular framework 32 with that of an adjacent gate. As discussed above, sequencing gates 18 are biased to a closed position and the nesting and gap prevent unwanted noise when the gates automatically swing to their closed position upon the exiting of the cows. This quiet closing of gates 18 is important since it is desirable not to disturb or frighten the next group of cows entering milking platform 14.

Figure 15:
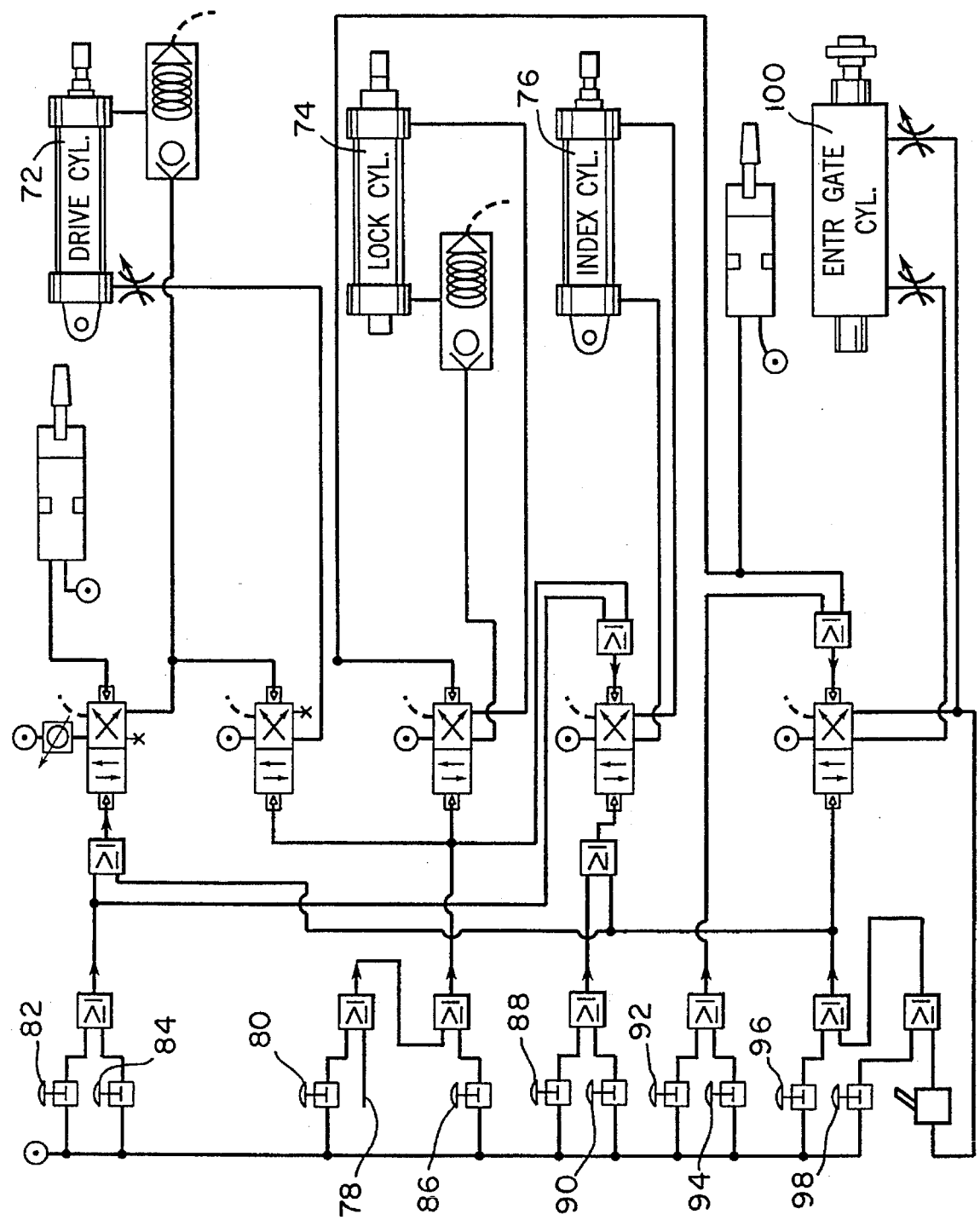
FIG. 15 is a schematic view of the pneumatic air logic utilized to control the milking parlor entry and exit operation.

As discussed above, sequencing gates 18 are biased to a closed position. This is accomplished by means of a torsion spring 40 mounted internally and co-axially with gate pedestal 42. Upper end 44 of torsion spring 40 is fixedly mounted in bushing assembly 46, while lower end 48 of torsion spring 40 is fixedly connected to lower bushing 50. Lower bushing 50 is held in place and prevented from rotating by the head 52 of eye bolt 54. The threaded end 56 of eye bolt 54 passes through upper bushing 46 and is held in place by nut 58. The head 52 of eye bolt 54 is held in place by pin 60 that passes through inner sleeve 62. Intermediate sleeve 64 is provided with a collar 66 that has an upwardly projecting stop 68. When sequencing gate 18 is pivoted clockwise by a cow entering the stall, torsion spring 40 is coiled. When the cow exits the stall, coil torsion spring 44 moves the sequencing gate counterclockwise to its closed position. Stop 68 engages edge 70 to stop the rotation of sequencing gate 18 and establish gap 38 described above. Milking parlor 10 is also provided with an automated entry/exit system that is controlled by the air logic diagram shown in FIG. 15. Drive cylinder 72, lock cylinder 74 and index cylinder 76 are positioned on the framework for rotating reel gate 22 and operate according to the teachings of the '280 patent. The operation of the automated system is initiated by an input signal 78 that is generated after the last milking unit is removed from a cow. A slight delay is provided so that if a milking unit is re-attached, the entry/exit process will not be initiated. The entry/exit process can also be initiated manually by use of push button valve 80. The system is provided with a series of push button valves 82 through 98 so that the entry/exit procedure can be started or stopped manually at any time. Upon receiving the input signal 78 or being manually started, the system initiates the movement of the rotating gate 22 to exit the unmilked cows. This operation is according to the '280 patent. When the exiting procedure has been completed, entrance gate cylinder 100 is energized and entrance gates 102 are opened via cylinder linkage 104. Simultaneously, a crowding gate (not shown) is activated to urge the cows in a holding area towards entrance gate 102.

As the cows enter single file through entrance gate 102 and onto platform 14, the first cow will open the first sequencing gate 18 forcing the second cow to open the second sequencing gate and so on down the line.

Figure 13:
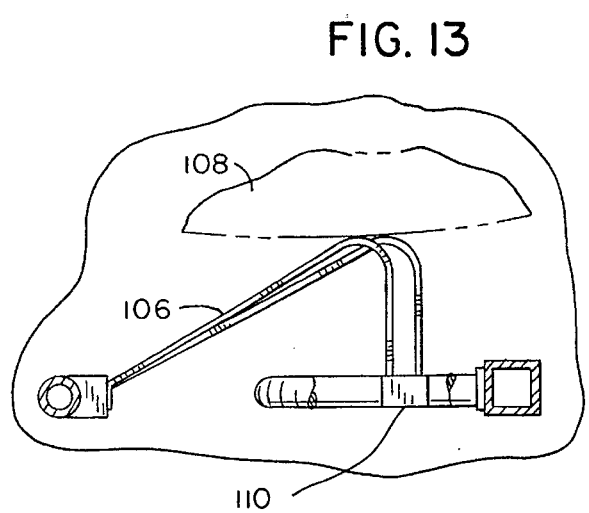
FIG. 13 is a sectional view along the line 13—13 of FIG. 10.

The last stall is provided with a wand detection system 106 as shown on FIG. 13. A cow 108 entering the last stall will brush up against wand 106 and close switch 110. This signal reverses entrance gate cylinder 100 and causes entrance gates 102 to close. Once gates 102 are closed, indexing cylinder 76 is energized to complete the positioning of the cows as described in the '280 patent.

Figure 14:
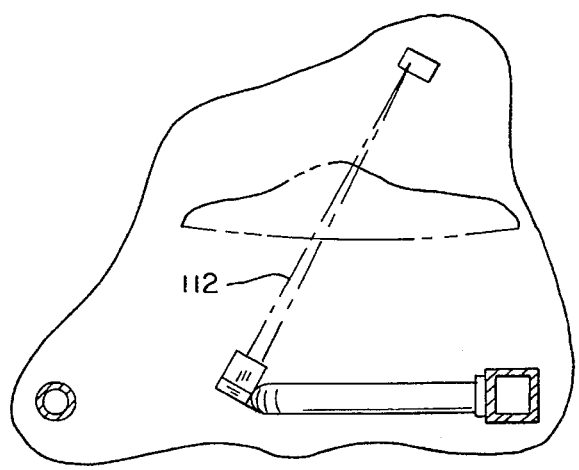
FIG. 14 is a plan view of an alternate embodiment of the switch shown in FIG. 13.

FIG. 14 illustrates an alternate embodiment for detecting the presence of a cow in the last stall. In this embodiment, a beam of light 112 is generated across the stall area and when a cow 108 enters the stall and breaks the beam, the gate closing process is initiated.

Various modes of carrying out the invention are contemplated as being within the scope of the following claims particularly pointing out and distinctly claiming the subject matter regarded as the invention.

I claim:

1. An automated milking parlor of the type having an entry gate through which cows are introduced one each into a plurality of stalls in the milking parlor, an elongated rotating gate mounted on a framework for positioning cows in a milking stall and urging the cows to exit the stall after milking and milking units for conducting the milking operation, said automated milking parlor comprising:

means for detecting the completion of the milking operation, said means operably connected to the rotating gate to initiate the exiting process of the rotating gate upon detection of the completion of the milking operation, means for detecting the rotation of the rotating gate, said means operably connected to the entry gate to open the entry gate upon detecting a predetermined amount of rotation of said rotating gate, means for detecting the number of cows passing through the entry gate, said means operably connected to the entry gate to close said gate upon detecting a predetermined number of cows entering the milking parlor and means for detecting the closing of the entry gate, said means operably connected to the rotating gate to initiate the positioning process of the rotating gate upon detection of the closing of the entry gate.

2. The automated milking parlor defined in claim 1 wherein the means for detecting the completion of the milking operation comprises means for detecting the removal of the last milking unit.

3. The automated milking parlor defined in claim 1 wherein the means for detecting the number of cows passing through the entry gate comprises means for detecting a cow in the last available stall.

4. A method for automating a milking parlor of the type having an entry gate through which cows are introduced one each into a plurality of stalls into the milking parlor, an elongated rotating gate mounted on a framework for positioning cows in a milking stall and urging the cows to exit the stall after milking and milking units for conducting the milking operation, said method comprising:

detecting the completion of the milking operation, initiating the exiting process of the rotating gate upon detecting the completion of the milking operation, detecting the rotation of the rotating gate, opening the entry gate upon detecting a predetermined amount of rotation of the rotating gate, detecting the number of cows passing through the entry gate, closing the entry gate upon detecting a predetermined number of cows passing through the entry gate, detecting the closing of the entry gate and initiating the positioning process of the rotating gate upon detecting the closing of the entry gate.

5. The method defined in claim 4 wherein the step of detecting the completion of the milking operation comprises detecting the removal of the last milking unit.

6. The method defined in claim 5 wherein the step of detecting the number of cows passing through the entry gate comprises detecting a cow in the last available stall.

* * * * *